June 16, 1936.  L. M. PERSONS  2,044,397
TEMPERATURE RESPONSIVE SWITCH
Filed Oct. 16, 1933
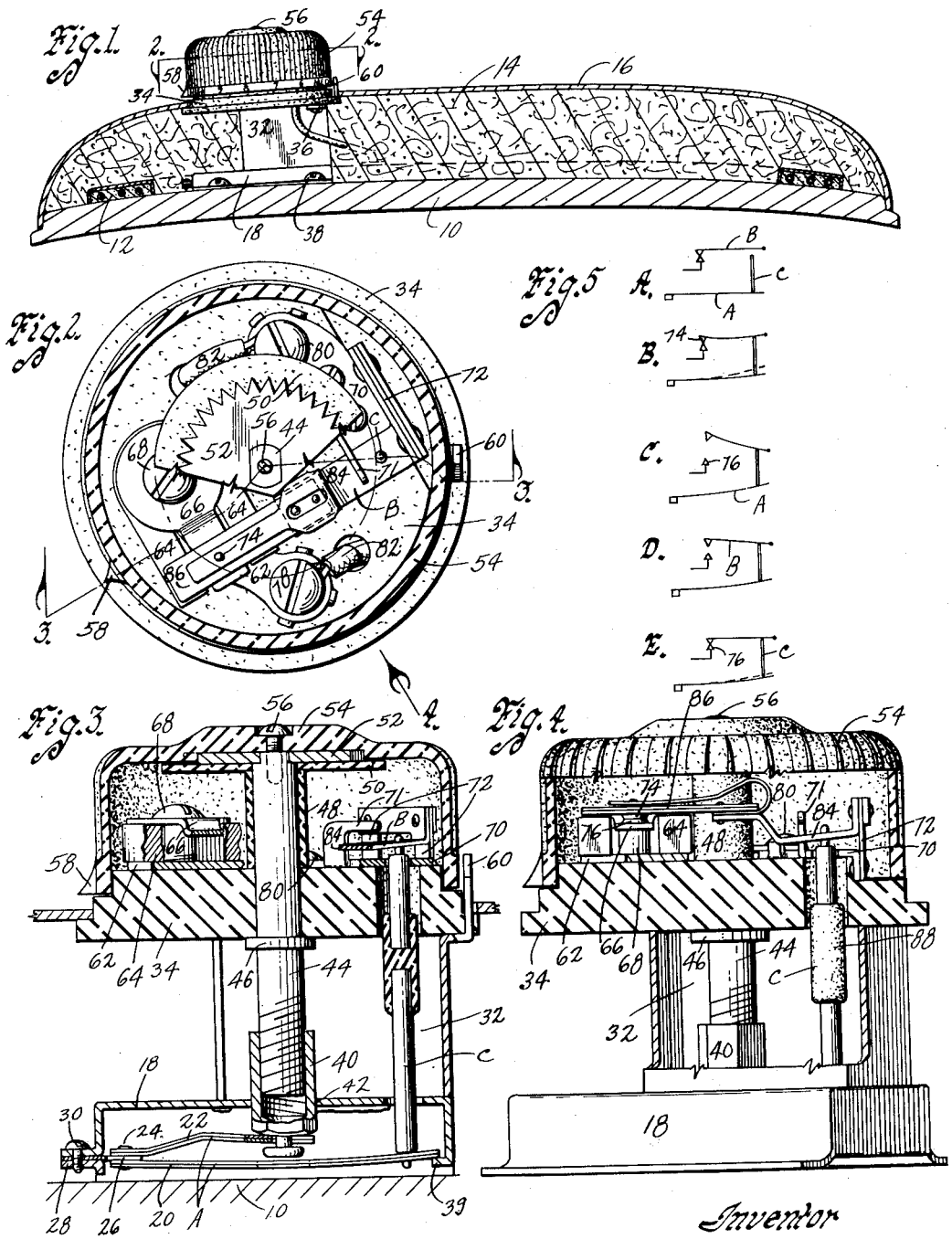
Inventor
Lawrence M. Persons
By Bair, Freeman & Sinclair
Attorneys
Witness
H. S. Munzenmaier Patented June 16, 1936

2,044,397

UNITED STATES PATENT OFFICE 2,044,397

TEMPERATURE RESPONSIVE SWITCH

Lawrence M. Persons, Des Moines, Iowa, assignor to Penn Electric Switch Co., Des Moines, Iowa, a corporation of Iowa Application October 16, 1933, Serial No. 693,812

6 Claims. (Cl. 200—139)

An object of my invention is to provide a temperature responsive switch especially adapted for ironers or other electric appliances having surfaces, the temperatures of which are to be automatically controlled and the switch being comparatively simple and inexpensive from a manufacturing standpoint.

A further object is to provide a temperature responsive switch which controls the temperature of an ironer sole plate or the like between comparatively narrow limits due to peculiar characteristics of the details of construction of the switch.

Still a further object is to provide a switch structure having a thermal responsive element located within a casing and switch mechanism located within a housing spaced from the casing, the housing being insulated and having switch mechanism therein including a part responsive to current flowing through the switch, such part being insulated from and therefore non-responsive to the heat which affects said thermal element.

A further object is to provide a novel switch construction in which an adjusting knob serves as part of the switch housing for enclosing switch mechanism and together with an insulating base forms a housing of insulation to enclose the switch mechanism.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a sectional view through an ironer to which the switch embodying my invention has been applied.

Figure 2 is an enlarged sectional view on the line 2—2 of Figure 1 showing details of the switch mechanism.

Figure 3 is a sectional view on the line 3—3 of Figure 2.

Figure 4 is a similar sectional view looking in the direction of the arrow 4 adjacent Figure 2; and Figure 5 illustrates successive positions of the parts of my switch structure.

On the accompanying drawing, I have indicated an ironer sole plate at 10. An electric heating element 12 is associated with the back thereof to heat the plate. A backing of insulation 14 is provided for the plate and is enclosed by a casing member 16. The parts 10, 12, 14, and 16 are shown merely by way of illustration to show one type of apparatus to which my temperature responsive switch can be applied. It is obvious that it can be applied to surfaces or located in environments other than on the back of the plate 10 for controlling electric current depending on temperature variations desired to affect the switch.

My switch includes a casing 18 adapted to house a thermal element A. The element A, as illustrated, is formed of a pair of bimetal members 20 and 22 riveted together at 24 at which point they are also riveted to a supporting leaf spring 26. The spring 26 is supported relative to the casing 18 by a bar 28 and screws 30.

A tubular post-like member 32 extends upwardly from the casing 18 and is surmounted by a switch mechanism base 34 of insulating material. The base 34 is secured to the member 32 by screws 36 or the like.

One end of the thermal element A is adapted to rest against a flange 38 of the casing 18. The other end thereof is associated with a nut 40 which is non-rotatable in an angular opening 42 of the casing 18 but slidable relative thereto. For adjusting the nut 40 I provide a rod 44 threaded thereinto and held non-slidable relative to the base 34 by a collar 46, an insulating sleeve 48, an insulating washer 50, a serrated disk 52 and a knob 54. The knob 54 is secured to the rod 44 by a screw 56.

The knob 54 is limited in its rotation by a pointer 58 adapted to engage a stop 60 extending upwardly from the member 32. The rod 44 may be adjusted and then the knob 54 secured thereto in the desired position because of the serrated connection between the disk 52 and the knob whereby an initial factory adjustment can be made.

The base 34 and the knob 54 both being of insulating material form a housing for switch mechanism which includes a terminal plate 62, a magnet 64 and a contact plate 66, all held in assembled position relative to the base 34 by a screw 68.

The switch further includes a terminal plate 70, a leaf spring 72 extending upwardly therefrom, a switch arm B and a contact 74 carried by the switch arm and adapted to coact with a contact 76 carried by the contact plate 66. The terminal plate 70 is provided with a stop arm 71 for the switch arm B. Terminal screws 78 and 80 are provided for securing lead-in wires 82 to the terminal plates 62 and 70.

The switch arm B comprises a primary part

84 and a secondary part 86. The secondary part is formed of bimetal and the switch arm carries current when the contacts 74 and 76 are engaged whereby the portion 86 of the switch arm will warp one way or the other, depending on whether or not current is flowing therethrough.

An operative connection is provided between the thermal element A and the switch arm B by means of a push rod C. The rod C includes an insulating portion 88 adapted to prevent the transmission of heat from the thermal element A to the switch arm B.

*Practical operation*

In the operation of my switch structure, the parts are normally in the position of Figure 5 at A. When the heating element 12 is connected with a source of current supply, it will heat the plate 10, causing the thermal element A to warp to the full line position shown at B, for instance.

The flow of current from the terminal 78 to the terminal 80 is through the terminal plate 62, screw 68, contact plate 66, contact 76, contact 74, bimetal element 86, the primary portion 84 of the switch arm, the spring 72 and the terminal plate 70. By reason of current flowing through the bimetal element 86, it will warp toward open circuit position, as shown at B, the magnet 64 however keeping the contacts 74 and 76 engaged.

By this time, the lost motion is taken up at the ends of the push rod C and upon further heating of the plate 10 so as to tend to warp the thermal element A to the dotted line position at B for instance, there will be a tendency to separate the switch contacts. A little further rise in the temperature of the plate 10 will have stored up sufficient energy in the thermal element A to overcome the magnetic pull so that the switch arm B will snap to open position at C.

This breaks the current to the heating element 12 so that the plate 10 will cool down, but also the current has been discontinued through the bimetal part 86 of the switch arm so that it will soon warp again to its original straight position at D. This partially closes the switch contacts so that it takes but very little movement of the thermal element A downwardly from the position shown at D to permit the magnet to draw the contacts closed, as at E, and spring the thermal element A from the dotted line position to the full line position therein shown.

Having described the operation in Figure 5, I can now point out how the differential of operation of my switch structure is reduced. Ordinarily the magnet 64 increases the differential of operation so that it takes, for instance, an eighty-five degree change in temperature to move the switch from one position to the other. A magnet however is desirable so as to extinguish the arc between the contacts and at the same time give snap action to the switch arm, as on ironers of this character a heavy current must be controlled.

Therefore, by providing the bimetal element 86, it will warp as at B in Figure 5, tending to open the switch sooner and will warp back, as at D, tending to close it sooner and thus reduce the differential of operation to a minimum, for instance five or ten degrees. The relative limits of the elements A and 86 can be so proportioned that this differential can be reduced to any desired figure.

It is very important that the element 86 is not affected in any degree by the temperature affecting the element A. This is accomplished by spacing the switch mechanism from the element A and enclosing it in an insulating housing and by making the push rod C of such construction that transmission of heat is prevented. Also, the adjusting rod 44 which would transmit heat is insulated from the interior of the switch housing by the bushing 48 and the disk 50.

The switch housing is mounted adjacent the surface of the casing member 16 in Figure 1, while the casing 18 for the element A is located next to the plate 10. This spaces them from each other and also the insulation 14 ordinarily provided serves to prevent transmission of heat. The knob 54 being of the particular cross section illustrated serves admirably as a housing for the switch mechanism. The knob can be easily adjusted relative to the rod 44 so that it is operable over any working range desired.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A temperature responsive switch comprising a switch base, a thermal element supported relative thereto and responsive to temperature, switch mechanism upon said base, said thermal element being associated therewith to operate said switch mechanism depending on temperature changes affecting said thermal element and means for adjusting the range of said thermal element including a hollow knob having one end open, said knob being rotatable relative to said base and said base closing the open end of said knob whereby said knob and base enclose said switch mechanism.

2. A temperature responsive switch comprising a base of insulating material, a thermal element spaced therefrom and responsive to temperature, an adjusting rod extending through said base for changing the range of said thermal element, a knob on said adjusting rod above said base, switch mechanism on said base operable by movement of said thermal element, said switch mechanism including a thermally responsive switch arm responsive to the flow of current through the contacts of said switch mechanism and means for preventing heat from said adjusting rod affecting said switch arm comprising insulation surrounding said adjusting rod.

3. A temperature responsive switch comprising a base of insulating material, a thermal element spaced therefrom and responsive to temperature, an adjusting rod extending through said base for changing the range of said thermal element, switch mechanism on said base operable by movement of said thermal element, said switch mechanism including a thermally responsive switch arm responsive to the flow of current through the contacts of said switch mechanism, means for preventing heat from said adjusting rod affecting said switch arm comprising insulation surrounding said adjusting rod and a control knob on said adjusting rod above said base, said control knob being hollow and enclosing said switch mechanism.

4. A temperature responsive switch structure comprising a thermal element, an insulated switch housing spaced therefrom, switch mechanism within said switch housing operatively connected with said thermal element and including a warpable switch arm responsive to flow of current through the switch mechanism to decrease the differential of operation of said thermal element and means for adjusting said thermal element comprising a slidable and non-rotatable nut operatively connected therewith, a rod threaded into said nut and a knob for adjusting said rod, said knob being limited in rotation and having a disconnectible serrated connection with said rod.

5. For use with an electrically heated plate having a backing of insulation, a temperature responsive switch comprising a casing adapted for contact with said plate, a thermal element therein, a housing of insulation spaced from said casing and positioned at the outer surface of said backing of insulation, switch mechanism therein and an operative connection between said thermal element and said switch mechanism, said housing comprising in part a control knob associated with said first mentioned thermal element for adjusting its range of operation and said operative connection extending from said casing through said backing of insulation and to said housing.

6. A temperature responsive switch structure comprising a thermal element, an insulated switch housing spaced therefrom, switch mechanism within said switch housing operatively connected with said thermal element and means for adjusting said thermal element comprising a slidable and non-rotatable nut operatively connected therewith, a rod threaded into said nut and a knob for adjusting said rod, said knob being limited in rotation and having a disconnectible serrated connection with said rod whereby it may be disconnected from the rod, adjusted rotatably relative thereto and then re-connected therewith to secure a different range of the switch throughout such limited rotation of the knob.

LAWRENCE M. PERSONS.